US008430022B2

(12) United States Patent
Hostettler

(10) Patent No.: US 8,430,022 B2
(45) Date of Patent: Apr. 30, 2013

(54) BREWING APPARATUS FOR A COFFEE MACHINE

(75) Inventor: Hans-Ulrich Hostettler, Wichtrach (CH)

(73) Assignee: Schaerer AG, Zuchwil (CH)

( * ) Notice: Subject to any disclaimer, the term of this patent is extended or adjusted under 35 U.S.C. 154(b) by 377 days.

(21) Appl. No.: 12/729,520

(22) Filed: Mar. 23, 2010

(65) Prior Publication Data

US 2010/0224074 A1 Sep. 9, 2010

Related U.S. Application Data

(63) Continuation of application No. PCT/EP2008/061709, filed on Sep. 4, 2008.

(51) Int. Cl.
*A47J 31/36* (2006.01)

(52) U.S. Cl.
USPC .......................................... 99/289 R; 99/302 P

(58) Field of Classification Search ................. 99/289 R, 99/287, 302 P
See application file for complete search history.

(56) References Cited

U.S. PATENT DOCUMENTS

| 5,307,734 | A | * | 5/1994 | Lussi et al. | 99/287 |
|---|---|---|---|---|---|
| 5,316,781 | A | * | 5/1994 | Lussi et al. | 426/433 |
| 5,333,537 | A | * | 8/1994 | Lussi et al. | 99/287 |
| 5,367,947 | A | * | 11/1994 | Lussi et al. | 99/287 |
| 7,322,275 | B2 | * | 1/2008 | Lussi | 99/281 |
| 8,225,709 | B2 | * | 7/2012 | Carbonini et al. | 99/289 R |
| 2010/0307345 | A1 | * | 12/2010 | Wuthrich | 99/289 R |
| 2011/0011272 | A1 | * | 1/2011 | Lussi | 99/289 R |
| 2011/0185909 | A1 | * | 8/2011 | Sinzig | 99/289 R |

FOREIGN PATENT DOCUMENTS

| EP | 0528758 A1 | 2/1993 |
|---|---|---|
| EP | 1483992 A1 | 12/2004 |
| FR | 2562782 A1 | 10/1985 |

OTHER PUBLICATIONS

International Search Report dated Jun. 11, 2008.

* cited by examiner

*Primary Examiner* — Raleigh W. Chiu
(74) *Attorney, Agent, or Firm* — Pearne & Gordon LLP

(57) ABSTRACT

A brewing apparatus (1) for a coffee machine comprises a brewing cylinder (6) with a cylindrical bore and an upper piston and a lower piston (4), by means of which the brewing cylinder (6) is able to be closed off in order to form a brewing chamber. The brewing cylinder (6) and the pistons are held in a frame (2) in a way displaceable relative to one another, and are drivable via a spindle (9). Interacting with the spindle is a threaded part (7a) which is arranged on a driven part (7) fitted on the brewing cylinder (6). A coffee-powder-feed device is provided for filling the brewing chamber with coffee powder, and a stripping element (19) serves for stripping off the coffee-powder cake which remains on the surface (4a) of the bottom piston (4) following the brewing operation. The rear-side surface (31) of the stripping element (19) is provided with a protrusion (32) which is arranged on the region directed towards the piston surface (4a) and which has at least one deflecting surface (33, 34) which is inclined in relation to the stripping-off direction. Residues of coffee powder which can accumulate behind the stripping element (19) can be conveyed away laterally by this inclined deflecting surface, it being ensured that the stripping element can reach the rest position.

6 Claims, 7 Drawing Sheets

BREWING APPARATUS FOR A COFFEE MACHINE

Figure 1:
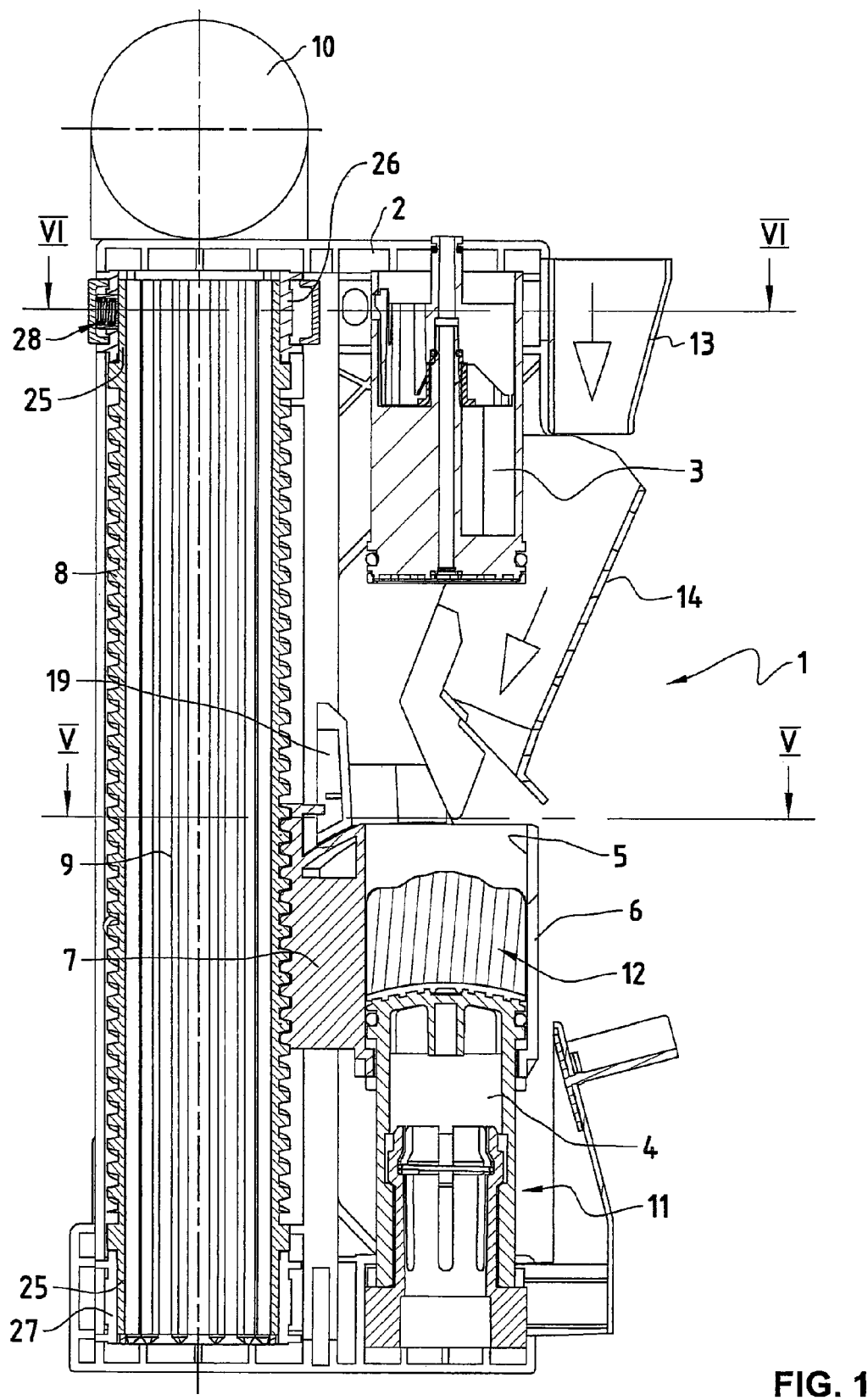

RELATED APPLICATIONS:

This application is a continuation of patent application PCT/EP2008/061709, filed Sep. 4, 2008, which claims foreign priority from EP application 07117121.9, filed Sep. 25, 2007.

The present invention relates to a brewing apparatus for a coffee machine, comprising a brewing cylinder with a cylindrical bore and an upper piston and a lower piston, by means of which the brewing cylinder is able to be closed off to form a brewing chamber, the brewing cylinder and the pistons being held in a frame in a way displaceable relative to one another and being drivable via a drive device, which drive device comprises a spindle, the two ends of which are rotatably mounted in the frame, in which spindle a threaded part engages, the threaded part being arranged on a driven part attached to the brewing cylinder, a coffee-powder feed device for filling the brewing chamber with coffee powder, a stripping element for stripping off, into a collection container, the coffee-powder cake which is ejected from the brewing chamber by the lower piston after the brewing process and which is on the piston surface of the lower piston, the stripping element being mechanically drivable and having a stripping surface and a rear-side surface opposite the stripping surface.

Brewing apparatuses of this kind are known in various designs and are used both in household coffee machines and in restaurant coffee machines. To dispense a coffee, the required amount of (usually freshly ground) coffee powder, dependent upon which type of coffee is dispensed, such as normal coffee espresso coffee, ristretto coffee, etc. is filled into the brewing chamber. The brewing chamber is then closed, and hot water is fed at the desired pressure through the brewing chamber, so as to brew the coffee. The coffee thus freshly brewed then issues via an outlet into the waiting vessel. The brewing chamber is subsequently opened, and the coffee powder residue located therein is ejected from the brewing chamber into a container.

Such a brewing apparatus is known from EPA 0528 758. A spindle, rotatably drivable via a drive motor, is provided for opening and closing of the brewing chamber. Via this spindle, which is provided with a threading, the brewing cylinder is displaced along the spindle. For this purpose, the brewing cylinder is provided with a driven part, which is provided with a threaded part which engages with the threading of the spindle and which extends around a certain region of the spindle.

After the brewing step for a coffee, the brewing chamber is opened in that the brewing cylinder is pushed downward by means of the spindle, away from the upper piston, the lower piston being carried along by the spindle. The lower piston then hits against a stop and remains held there. The brewing cylinder is driven on downwards, such that the coffee-powder cake is ejected out of the brewing cylinder by the stationary lower piston. When the piston surface of the lower piston has reached the edge of the brewing cylinder, the piston is driven downward together with the brewing cylinder. During this displacement, the stripping element, which is coupled to the brewing cylinder, and which is at rest between brewing cylinder and driven part, is driven via a crank drive over the upper edge of the brewing cylinder and the piston surface of the lower piston, whereby the coffee-powder cake located here is stripped off into a collection vessel.

In order to be able to achieve an optimal functioning of this brewing apparatus, and since the individual parts are manufactured in an injection molding process in an abrasion-resistant plastic, for example POM (polyoxymethylene), which requires relatively large tolerances, a corresponding amount of play must be allowed for between the individual mutually moving parts. This means that, when stripping off the coffee-powder cake from the piston surface and the upper edge of the brewing cylinder, there is a gap to the stripping element through which coffee powder residue can slip through during ejection, and can remain on the corresponding surfaces. When the stripping element is pivoted back again, these coffee powder residues can be carried on to the driven part behind the brewing cylinder. So much coffee powder can accumulate in this region that the stripping element is no longer able to assume its resting position since the coffee powder residues can become trapped between the back wall of the driven part and the rear surface of the stripping element. This coffee powder residue can accumulate so much that the stripping element collides with the upper piston upon closing of the brewing chamber, which can lead to malfunction of the brewing apparatus and even to instances of damage.

The object of the invention is thus to design this region to avoid an accumulation of coffee powder residue, so as to ensure that the stripping element is able to assume the resting position and is not hindered from doing so by compressed coffee powder residues.

This object is achieved according to this invention in that the rear-side surface of the stripping element is provided with a protrusion, which is disposed on the region turned toward the piston surface, and which has at least one deflecting surface, inclined with respect to the stripping direction.

Such a deflecting surface arrangement can ensure that the coffee powder residue which accumulates behind the stripping element, and which can become trapped between stripping element and rear side of the driven part, are carried away laterally. It is thereby ensured that the stripping element is able to assume its rest position, and that the danger of collision with the upper piston is avoided.

Advantageously, the protrusion is provided with two deflecting surfaces, which are disposed such that they form a wedge. By means of the wedge-shaped configuration of two deflecting surfaces, the coffee powder residue is carried away on both sides, which improves the functional reliability.

The side of the protrusion adjacent the piston surface is advantageously provided with a shape corresponding to the piston surface and the surface of the driven part, thus ensuring that the coffee powder residue remaining on the piston surface and the driven part are carried away at completely as possible.

The stripping surface of the stripping element preferably has a cylindrical shape, and extends around at least a third of the circumference of the coffee-powder cake which is to be stripped off. This ensures that the coffee powder cake to be stripped off is stripped off as completely as possible.

Another advantageous embodiment of the invention lies in the provision on the upper region of the stripping element, facing the upper piston, of a cam lobe which is beveled at an acute angle to the piston axis. When, upon the closing of the brewing chamber, the stripping element is not situated in the rear resting position, this bevel abuts on the upper piston, such that the stripping element is pressed against the rear resting position, and a collision of the stripping element with the upper piston is avoided.

Advantageously, one or both of the protrusion and the cam lobe is/are formed integral with the stripping element, which results in a compact and cost effective manufacture of this element, achievable by injection molding.

An embodiment of the present invention is explained more closely in the following, by way of an example, with reference to the attached drawing.

Shown are

Figure 2:
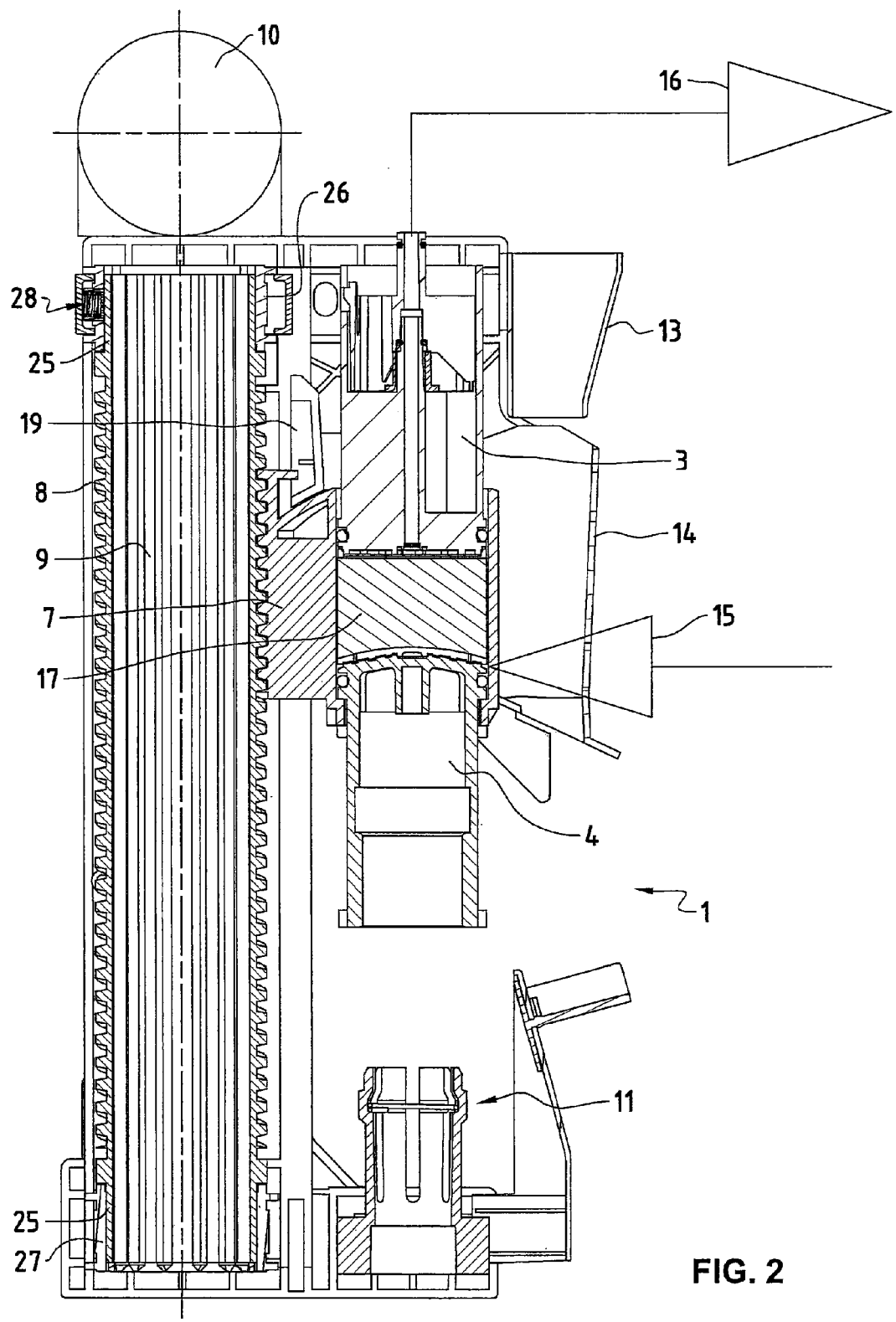
Figure 3:
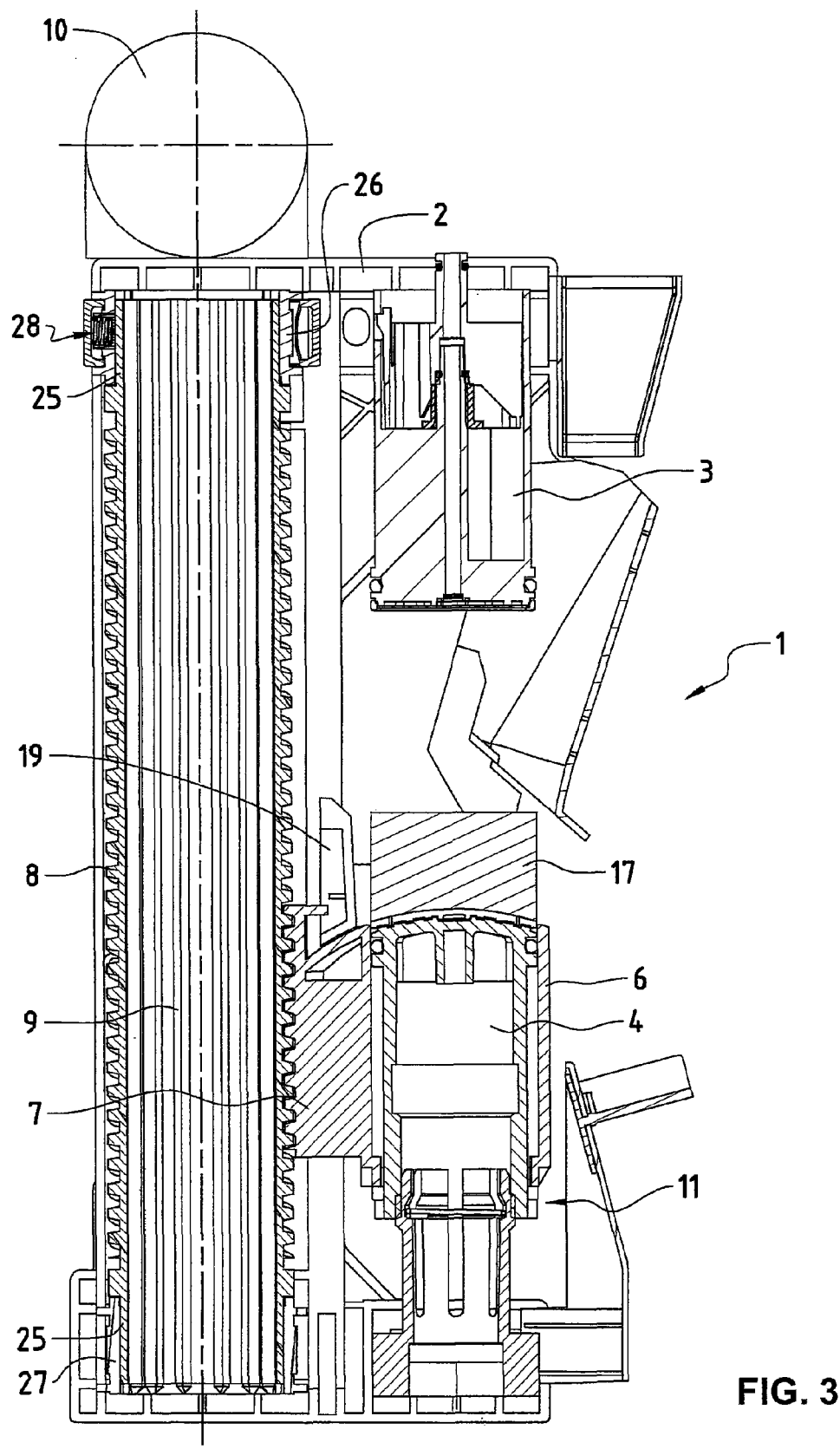
Figure 4:
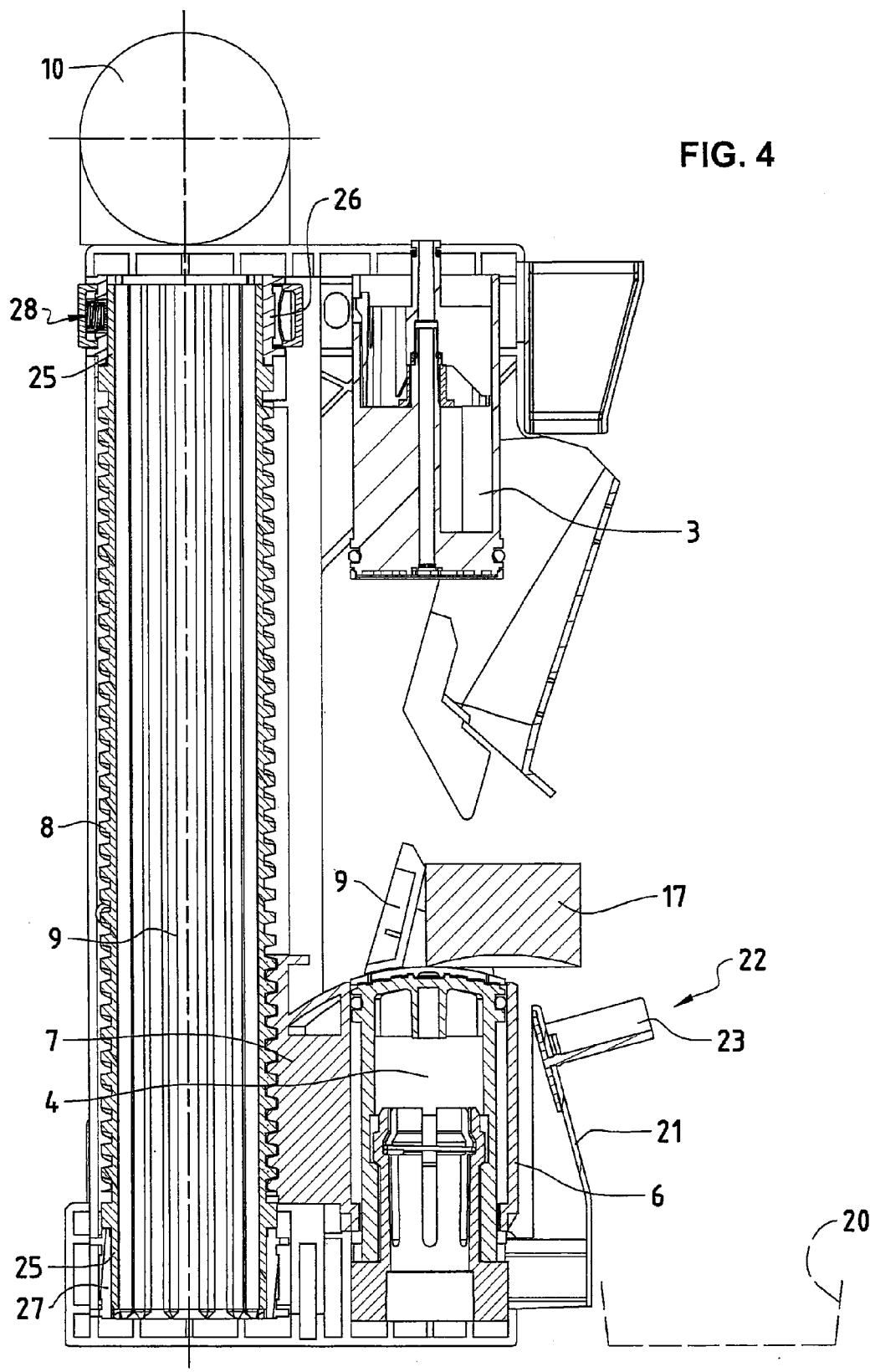
Figure 5:
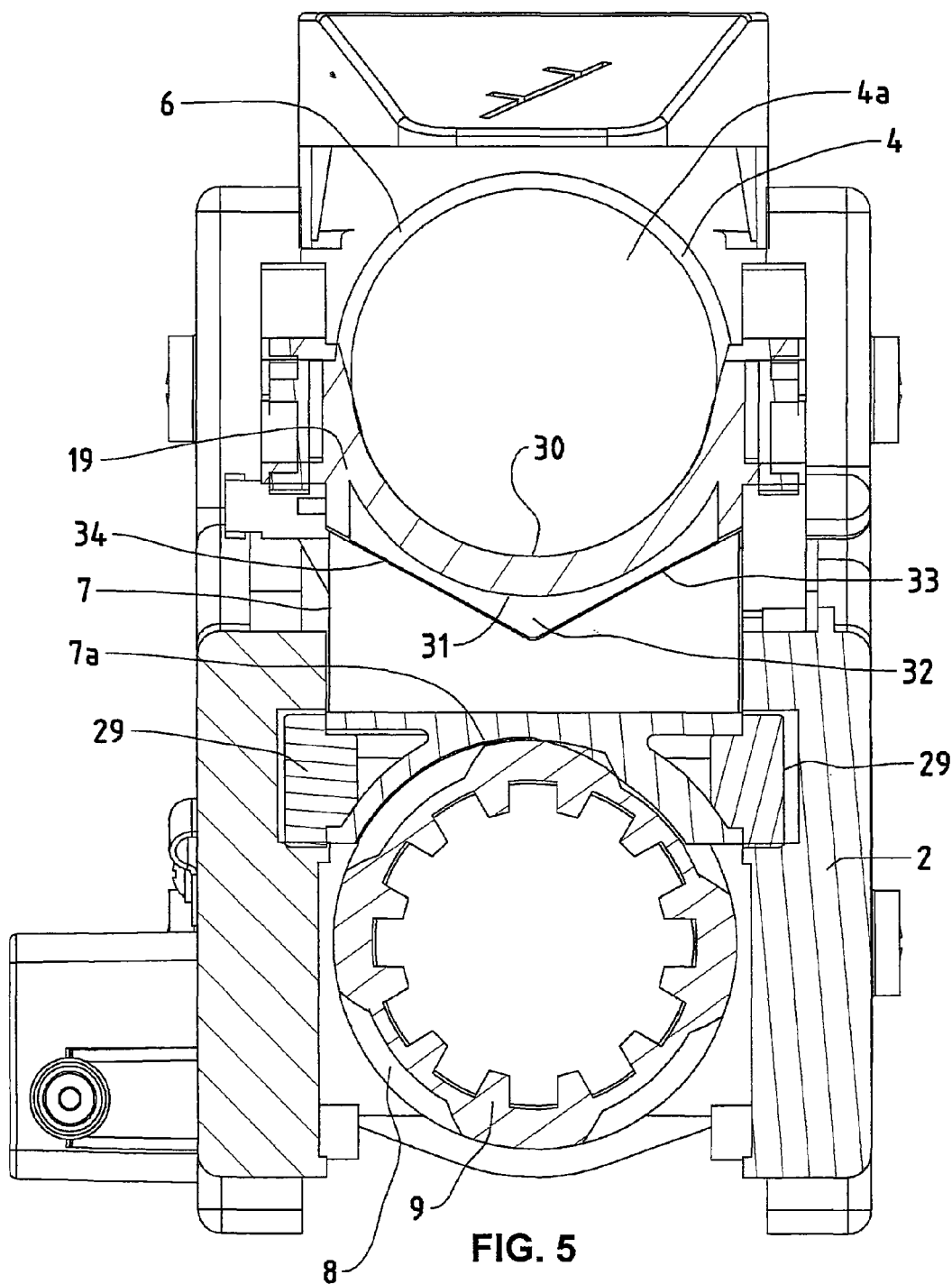
Figure 6:
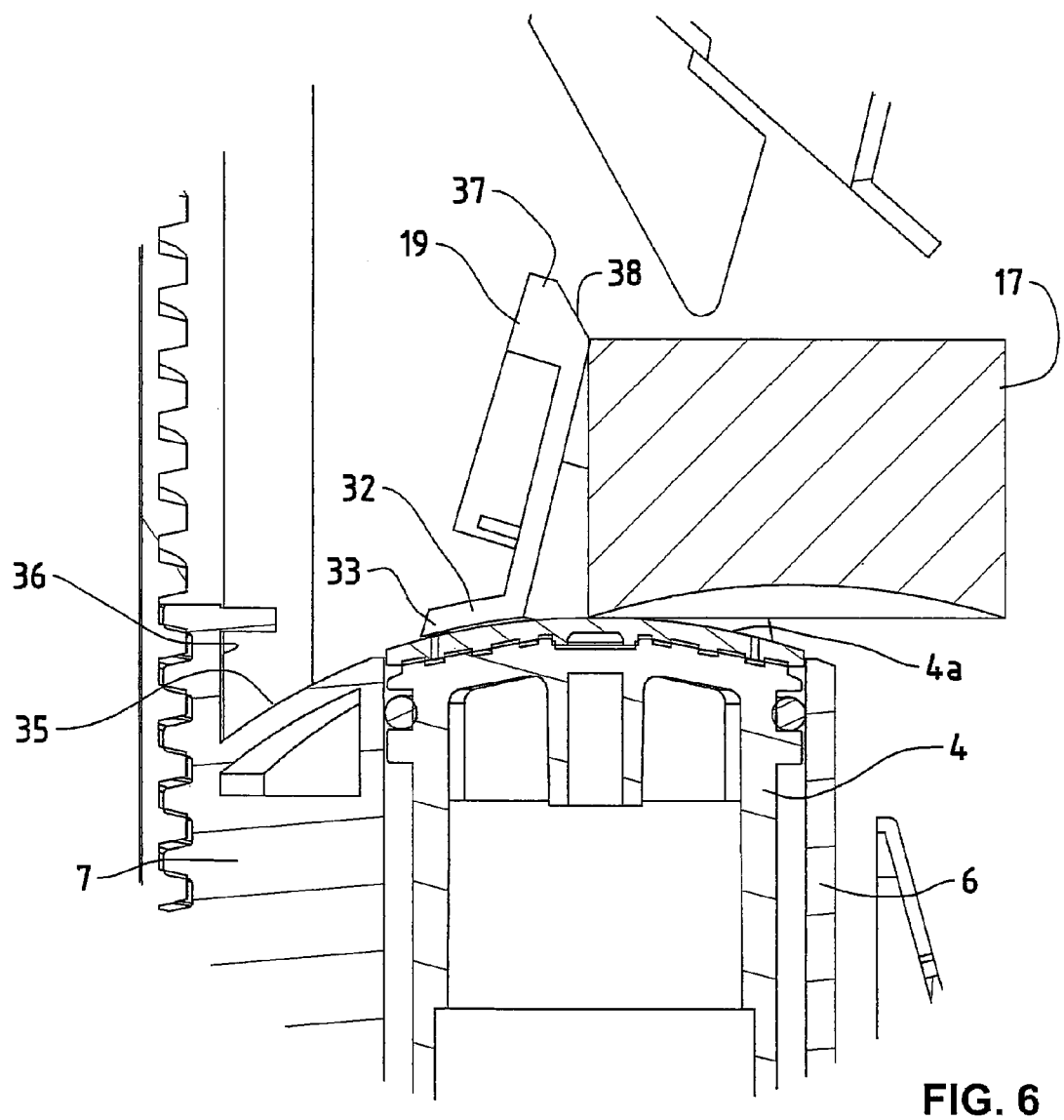
Figure 7:
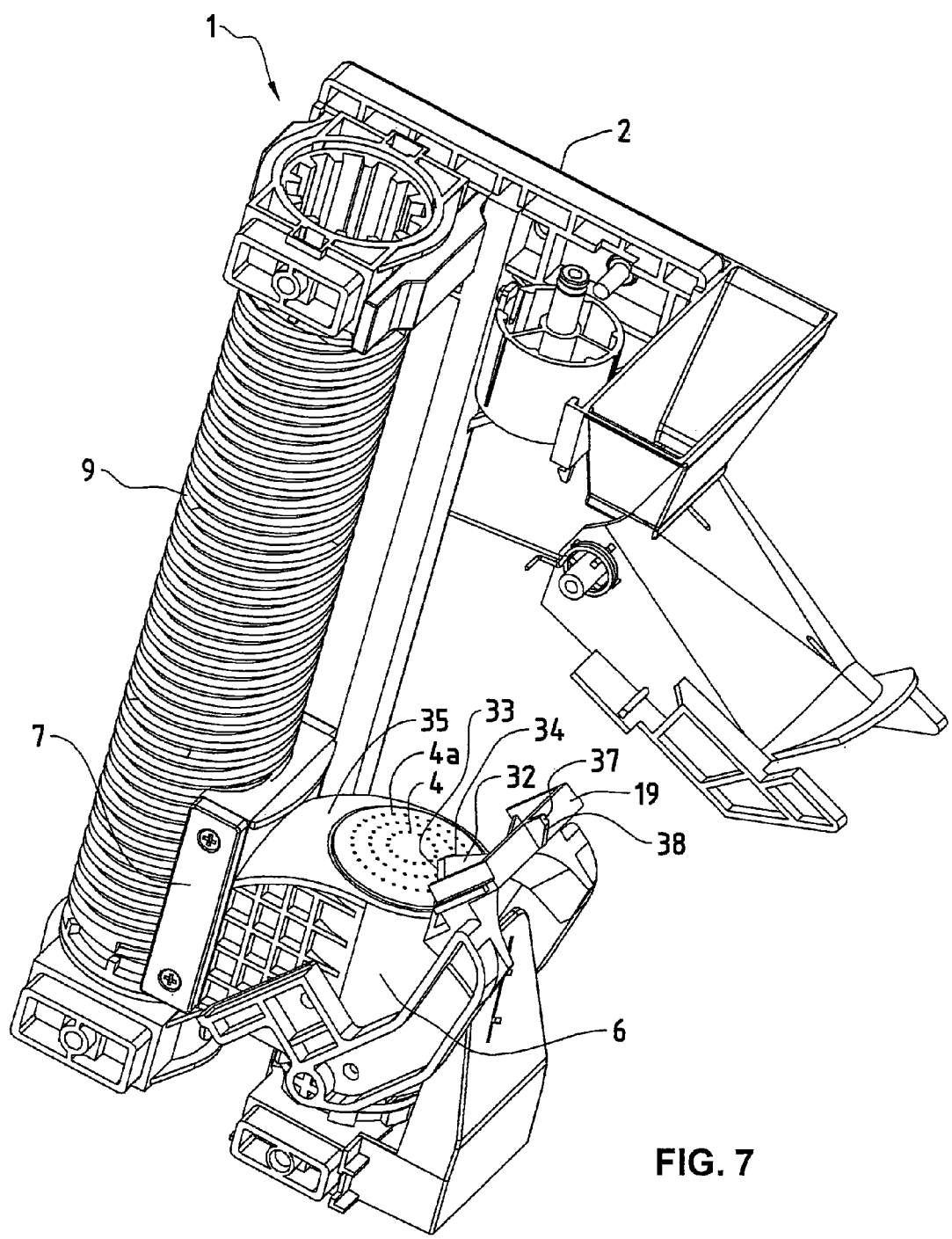

FIG. 1, a sectional drawing of a brewing apparatus for a coffee machine during step of filling coffee powder into the brewing chamber;

FIG. 2, a sectional drawing of the brewing apparatus with closed brewing chamber during the brewing process for a coffee;

FIG. 3, a sectional drawing of the brewing apparatus with opened brewing chamber and coffee powder cake ejected by the lower piston;

FIG. 4, a sectional drawing of the brewing apparatus with the beginning of the stripping of the coffee-powder cake by the stripping device;

FIG. 5, a sectional drawing through the brewing apparatus along the line V-V shown in FIG. 1;

FIG. 6, an enlarged sectional drawing through the lower piston and the stripping element shown in FIG. 4; and FIG. 7, the brewing apparatus in spatial representation with the stripping element in the completely driven-out position.

As can be seen from FIGS. 1 to 4, the brewing apparatus 1 comprises an upper piston 3 held located in the frame 2. Disposed axially opposite the upper piston 3 is a lower piston 4, which is axially displaceable with respect to the upper piston 3. This lower piston 4 is held in a cylindrical bore 5 of a brewing cylinder 6, which brewing cylinder 6 is likewise axially displaceable. The brewing cylinder 6 is provided with a driven part 7, to which a threaded part 7a is attached, which threaded part 7a is in engagement with a threading 8 of a spindle 9 rotatably held in the frame 2. This spindle 9 has a bearing pin 25 at both ends, which are slidably, rotatably held in bearing rings 26 and 27, mounted in the frame 2. Inserted in the bearing ring 26 is a support element 28, which eliminates the play between bearing pin 25 and bearing ring 26. The spindle 9 is drivable in a known way via an electromotor 10, which is also mounted on the frame 2.

The brewing apparatus 1 in FIG. 1 is shown in the filling position. This means that the lower piston 4 is situated in the lowest position, where it is held by the latch device 11. This position has been reached by the lower piston 4 because the brewing cylinder 6 has also been brought to the lowest position, by appropriate rotation of the spindle 9, taking the lower piston 4 along with it until it is latched in the latch device 11. The brewing cylinder 6 is then driven upwards again by appropriate rotation of the spindle 9, as can be seen in FIG. 1. The lower piston now remains in the lowest position, and the brewing cylinder 6 has thus moved up relative to the lower piston 4, such that the brewing chamber 12 is formed inside the brewing cylinder 6, closed off below by the lower piston 4. In this filling position, the stripping element 19 is in its rest position above the driven part 7, and is thus outside the region of the brewing cylinder 6 into which the upper piston 3 penetrates to close off the brewing cylinder 6.

The freshly ground coffee powder is now fed into the brewing chamber 12. This coffee powder is ground in a known way in a coffee mill, which is not shown and which is likewise housed in the coffee machine concerned. The powder arrives in a coffee mill 13, via a first hopper 13 into a pivotable hopper 14, through which the ground coffee powder is fed into the brewing chamber 12. At this point, the amount of supplied coffee powder is metered out, depending upon the type of coffee to be dispensed.

After the filling of the brewing chamber 12 with freshly ground coffee powder, the spindle 9 is set in rotation by means of the electromotor 10. The threaded part 7a on the driven part 7 drives the brewing cylinder 6 upward, the lower piston 4 being carried along by means of suitable drivers.

The brewing cylinder 6 and the lower piston 4 are driven upwards until a point at which the brewing chamber 12 is closed off by the upper piston 3 and the coffee powder in the brewing chamber 12 is compressed. The stripping element 19, currently in the rest position, is now positioned between the upper piston 3 and the spindle 9. In this orientation, shown in FIG. 2, the brewing state has been reached. The hot water can now be supplied from below into the brewing chamber 12 in known fashion, as indicated by arrow 15. The hot water flows throughout the brewing chamber 12 and the enclosed ground coffee powder, and is conveyed through an outlet channel in the upper piston 3, in known fashion, where it issues, as brewed coffee, indicated by arrow 16, through a discharge outlet of the coffee machine, also in known fashion, but not illustrated, and from there into the waiting vessel. When brewing the coffee, the coffee powder in the brewing chamber 12 is compressed between pistons 3 and 4 such that the coffee presents a resistance against the flow of the brewing water so that the brewing water must be forced through the brewing chamber 12 at a pressure of about 8 bar. The waste coffee powder remains in the brewing chamber 12 and forms a very compact and moist coffee-powder cake.

As can be seen from FIG. 2, the pivotable hopper 14 is pivoted out with the lower piston 4 when the brewing cylinder 6 is moved upwards. This pivotable hopper 14 is fitted with a spring (not shown) to urge the pivotable hopper 14 back into the position illustrated in FIG. 1.

After completion of the brewing operation, the brewing chamber 12 is opened by suitable rotation of the spindle 9 to drive the brewing cylinder 6 and the lower piston 4 downwards, as shown in FIG. 3. The bottom end of the lower piston 4 reaches latch device 11, and is then held by the latch device 11. The brewing cylinder 6 is driven on downwards while the lower piston 4 remains stationary, with the result that the coffee-powder cake 17 is ejected from the brewing cylinder 6, as can be seen from FIG. 3. When the upper edge of the brewing cylinder 6 has reached the upper edge of the lower piston 4, the ejected coffee-powder cake 17 lies on the upper surface 4a of the lower piston 4, and the lower piston 4 is moved, by means of suitably arranged stops, with the brewing cylinder 6 (which is capable of being further displaced downwards), into the latch device 11, as illustrated in FIG. 4. When the brewing cylinder 6 and the lower piston 4 reach the vicinity of the lower position, the stripping element 19, which is coupled to the brewing cylinder in known fashion, is moved by a known crank mechanism (not illustrated) attached to frame 2. This causes the stripping element 19 to travel across the piston surface 4a of the lower piston 4, so that the coffee powder cake 17 is stripped off the lower piston as can be seen from FIG. 4.

The coffee-powder cake 17 to be ejected now passes, via a chute 21 attached to frame 2, into a container 20 housed in the coffee machine. Dividing element 22, which in this example embodiment is implemented as a blade 23, is attached to chute 21 and serves to cut up into small pieces the coffee-powder cake 17 which passes via the chute 21 into the container 20.

Once the coffee-powder cake 17 has been ejected, the brewing cylinder 6 can be returned to its filling state (as shown in FIG. 1) by suitable rotation of the spindle 9, and the brewing apparatus is ready for brewing another coffee. In the first part of this returning process, the ejection element 19 is returned by the crank operation from the fully extended position back to the rest position.

In FIG. 5 the spindle 9 can be seen, arranged in frame 2. Spindle 9 is equipped with threading 8, which is engaged by threaded part 7a of the driven part 7. The driven part 7 is guided in frame 2 by linear guides 29. Attached to the driven part 7 is the brewing cylinder 6, in which the lower piston 4 with the piston surface 4a is arranged. Between the brewing cylinder 6 and the spindle 9 is the stripping element 19, which has a stripping surface 30 and a rear-side surface 31 on the opposite side to the stripping surface. The stripping surface 30 has a cylindrical form which extends around the coffee-powder cake 17 during the stripping off of the coffee-powder cake 17 so as to achieve an optimal stripping off.

On the rear-side surface 31 of the stripping element 19 is a protrusion 32, which is arranged in the region of the stripping element 19 facing the piston surface 4a, and which is provided with two deflecting surfaces 33 and 34, which are arranged for form a wedge shape.

FIG. 6 shows how the stripping element 19 strips the coffee-powder cake off the piston surface 4a of the lower piston 4, which is disposed in the brewing cylinder 6. The stripping element 19 follows the curved piston surface 4a, such that there is a gap between the underside of the stripping element 19 and the piston surface 4a. The face of the stripping element 19 adjacent to the piston surface 4a and the face of the protrusion 32 is shaped with a curved profile corresponding to the curved piston surface 4a and the upper surface 35 of the driven part 7.

When the stripping element 19 strips the coffee-powder cake off, some coffee powder residue can remain on the piston surface 4a because of the gap which must exist between the piston surface 4a and the stripping element 19. When the stripping element 19 is pivoted back again, this coffee powder residue can be carried back with the stripping element 19 and is deposited on the upper surface 35 of the drive part 7. After many coffees have been dispensed, the amount of coffee powder residue on the upper surface 35 can grow to the point where it becomes pressed in between the wall 36 of the driven part 7 and the stripping element 19. This pressed-in coffee powder can accumulate so much that the stripping element 19 can no longer move back into its rest position. When the brewing cylinder is closed into the brewing position, as shown in FIG. 2, it could happen that the upper edge of the stripping element 19 collides with the upper piston 3, which would lead at least to a malfunction. To avoid the accumulation and compressing of coffee powder in the region, the stripping element 19 is provided with the protrusion 32, as described above. The protrusion 32 has two deflecting surfaces 33 and 34 which form a wedge as can be seen in particular in FIG. 5. This wedge serves to clear away sideways coffee powder which accumulates on the upper surface 35, and thereby avoid a build-up of compressed coffee-powder in this region which would prevent the stripping element from reaching its rest position.

A cam lobe is attached on the upper area of the stripping element 19, facing towards the upper piston 3 (FIG. 1). The cam lobe has a beveled surface 38 which is aligned at an acute angle to the axis of the piston. If, despite the protrusion 32 and its deflecting surfaces 33 and 34, the stripping element 19 cannot return completely to its rest position when the brewing cylinder is closed, i.e. when the brewing cylinder 6 is moved up towards the upper piston 3 (see FIG. 2), then the bevel 38 on the stripping element cam lobe 37 would in this case encounter the lower edge side of the upper piston 3 and be pressed into the rest position, thus eliminating the possibility of a collision between the stripping element 19 and the upper piston 3.

FIG. 7 shows the brewing apparatus of the invention in perspective view, omitting the front side of the frame 2 for reasons of clarity. The spindle 9 in frame 2 is visible, the driven part 7 being linearly displaceable by spindle 9. The brewing cylinder 6, into which the lower piston 4 is inserted, is attached to the driven part 7. FIG. 7 also shows how the stripping element 19 is pivotably coupled to the brewing cylinder 6, such that the stripping element 19 can travel over the piston surface 4a and the upper surface 35 of the driven part 7, with the piston surface 4a and the upper surface 35 being correspondingly curved. The protrusion 32 is arranged on the stripping element 19 with its two deflecting surfaces 33 and 34 with which the coffee powder accumulated on the upper surface 35 can be cleared away sideways. Also visible is the cam lobe 37 attached to the stripping element 19 and equipped with bevel 38. As can also be easily seen from FIG. 7, the protrusion 32 and the cam lobe 37 are formed on the stripping element 19 by injection molding during the manufacturing process of the stripping element 19.

This device allows the stripping element always to return to the rest position, while coffee powder residues which can accumulate between the stripping element 19 and the wall 36 of the driven part 7 are conveyed away laterally.

The invention claimed is:

1. A brewing apparatus for a coffee machine, comprising a brewing cylinder with a cylindrical bore and an upper piston and a lower piston, by means of which the brewing cylinder is able to be closed off to form a brewing chamber, the brewing cylinder and the pistons being held in a way displaceable relative to one another in a frame and being drivable via a drive device, which drive device comprises a spindle, whose two ends are pivotably borne in the frame, in which a threaded part engages, which is disposed on a driven part attached to the lower piston, a coffee-powder feed device for filling of the brewing chamber with coffee powder, and a stripping element for stripping into a collection vessel of the coffee-powder cake, ejected from the brewing chamber by the lower piston after the brewing process and lying on the piston surface of the lower piston, which stripping element is mechanically drivable and has a stripping surface and a rear-side surface situated opposite the stripping surface, wherein the rear-side surface of the stripping element is provided with a protrusion which is disposed on the region facing the piston surface and has at least one deflecting surface, which is inclined with respect to the stripping direction.

2. The brewing apparatus according to claim 1, wherein the protrusion is provided with two deflecting surfaces, which are disposed such that they take the form of a wedge.

3. The brewing apparatus according to claim 1, wherein the side of the protrusions adjacent to the piston surface has a shape corresponding to the piston surface and the surface of the driven part.

4. The brewing apparatus according to claim 1, wherein the stripping surface has a cylindrical form and extends around the coffee-powder cake by at least one third.

5. The brewing apparatus according to claim 1, wherein a cam lobe is provided on the upper region, facing the upper piston, of the stripping element, the cam lobe having a beveled surface, which is aligned at an acute angle to the piston axis.

6. The brewing apparatus according to claim 1, wherein the protrusion and/or the cam lobe is/are integral with the stripping element.

* * * * *

UNITED STATES PATENT AND TRADEMARK OFFICE
CERTIFICATE OF CORRECTION

PATENT NO. : 8,430,022 B2  
APPLICATION NO. : 12/729520  
DATED : April 30, 2013  
INVENTOR(S) : Hans-Ulrich Hostettler It is certified that error appears in the above-identified patent and that said Letters Patent is hereby corrected as shown below:

Title Page, insert Item (30) as follows:

--(30)   Foreign Application Priority Data

Sept. 25, 2007   (EP) ..................... 07117121.9--

Signed and Sealed this  
Second Day of July, 2013

Teresa Stanek Rea  
*Acting Director of the United States Patent and Trademark Office*